United States Patent
Rychen et al.

(10) Patent No.: US 12,077,456 B2
(45) Date of Patent: Sep. 3, 2024

(54) APPARATUS AND METHOD FOR PROVIDING ULTRAPURE WATER

(71) Applicant: Ovivo Inc., Montreal (CA)

(72) Inventors: Philippe Rychen, Muespach-le-Haut (FR); Dominik Saladin, Muttenz (CH); Sylvain Keav, Leymen (FR)

(73) Assignee: Ovivo Inc., Montreal (CA)

( * ) Notice: Subject to any disclaimer, the term of this patent is extended or adjusted under 35 U.S.C. 154(b) by 66 days.

(21) Appl. No.: 17/051,356

(22) PCT Filed: Mar. 28, 2019

(86) PCT No.: PCT/IB2019/052577
§ 371 (c)(1),
(2) Date: Oct. 28, 2020

(87) PCT Pub. No.: WO2019/186476
PCT Pub. Date: Oct. 3, 2019

(65) Prior Publication Data
US 2021/0221705 A1 Jul. 22, 2021

(30) Foreign Application Priority Data
Mar. 28, 2018 (EP) .................... 18164647

(51) Int. Cl.
*C02F 1/32* (2023.01)
*C02F 1/42* (2023.01)
(Continued)

(52) U.S. Cl.
CPC ............... *C02F 1/325* (2013.01); *C02F 1/42* (2013.01); *C02F 1/705* (2013.01);
(Continued)

(58) Field of Classification Search
CPC .. C02F 1/325; C02F 1/42; C02F 1/705; C02F 2103/04; C02F 2201/002; C02F 2201/3223; C02F 2201/3228; C02F 2301/024
See application file for complete search history.

(56) References Cited

U.S. PATENT DOCUMENTS

| 4,969,991 A | 11/1990 | Valadez |
| 5,597,482 A * | 1/1997 | Melyon ................... C02F 9/005 210/260 |

(Continued)

FOREIGN PATENT DOCUMENTS

| EP | 0265031 | 4/1988 |
| FR | 2923733 | 5/2009 |

(Continued)

OTHER PUBLICATIONS

The product information page of Ionac NM60-SG (Year: 2011).*

(Continued)

*Primary Examiner* — Magali P Slawski
*Assistant Examiner* — Bernadette Karen McGann
(74) *Attorney, Agent, or Firm* — Thomas M. Freiburger

(57) ABSTRACT

The invention relates to an apparatus for providing ultrapure water, in particular ultrapure water for use in semiconductor fabrication.
This apparatus comprises at least one cylindrical reactor with an inner cylindrical shell, an outer cylindrical shell and a channel-like volume between inner shell and outer shell. According to the invention
said inner cylindrical shell houses at least one UV emission device,
said outer cylindrical shell comprises at least one means for reflecting UV radiation, and
(Continued)

Figure 1:
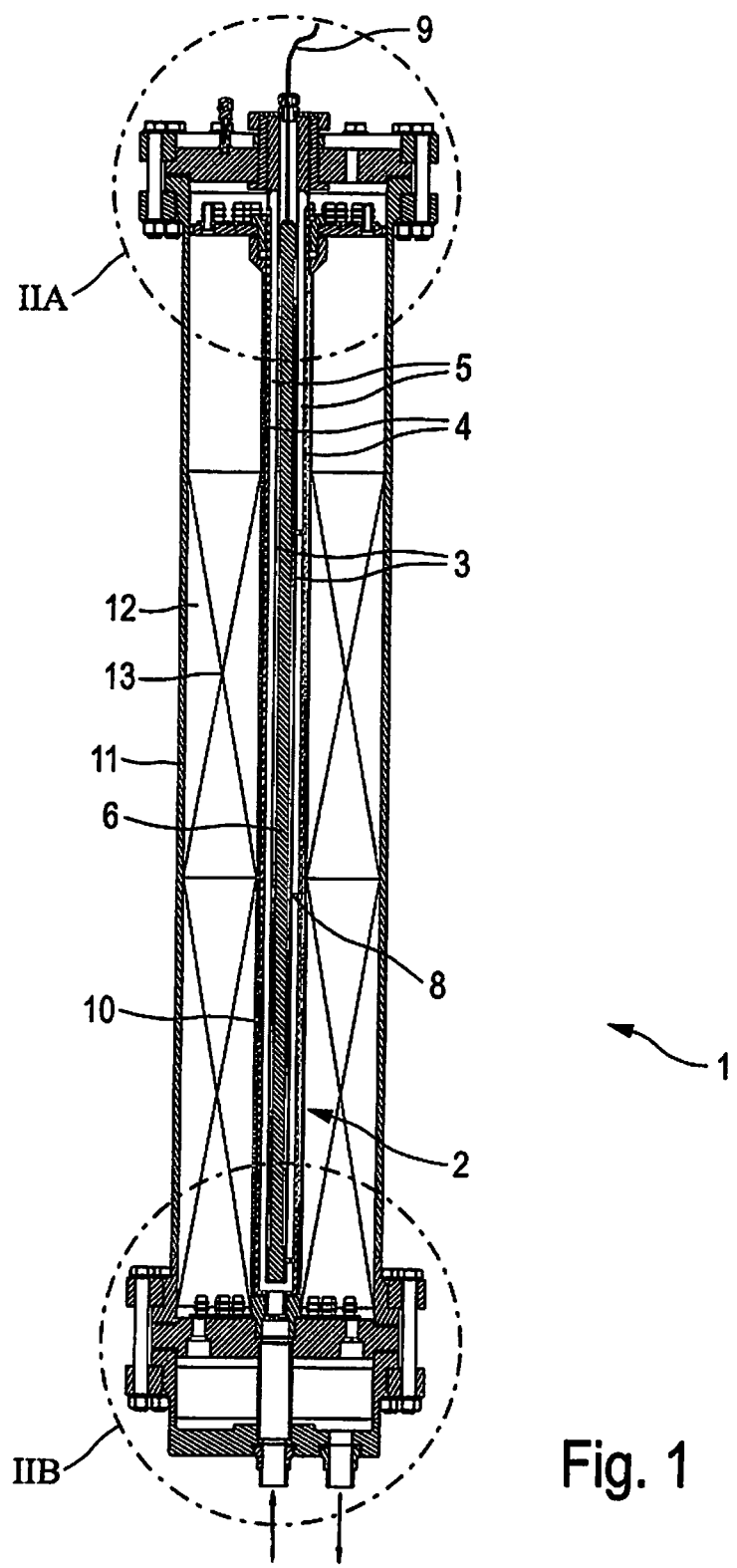

said channel-like volume is provided for flowing water through the reactor.

14 Claims, 4 Drawing Sheets

(51) Int. Cl.
    *C02F 1/70*    (2023.01)
    *C02F 103/04*    (2006.01)

(52) U.S. Cl.
    CPC .... *C02F 2103/04* (2013.01); *C02F 2201/002* (2013.01); *C02F 2201/3223* (2013.01); *C02F 2201/3228* (2013.01); *C02F 2301/024* (2013.01)

(56) References Cited

U.S. PATENT DOCUMENTS

| | | | |
|---|---|---|---|
| 9,511,344 B2 | 12/2016 | Cooper et al. | |
| 9,533,896 B2 | 1/2017 | Lee et al. | |
| 2002/0179508 A1* | 12/2002 | Nachtman | C02F 9/005 |
| | | | 210/136 |
| 2008/0224066 A1 | 9/2008 | Nolen et al. | |
| 2010/0078574 A1* | 4/2010 | Cooper | C02F 1/325 |
| | | | 250/455.11 |
| 2010/0310433 A1* | 12/2010 | Nyberg | C02F 1/001 |
| | | | 422/186.3 |
| 2011/0318237 A1 | 12/2011 | Woodling et al. | |
| 2013/0078142 A1 | 3/2013 | Gordon | |
| 2013/0220934 A1* | 8/2013 | Otani | C02F 1/32 |
| | | | 210/748.14 |

FOREIGN PATENT DOCUMENTS

| | | | |
|---|---|---|---|
| JP | 2014004506 | | 1/2014 |
| JP | 2016215150 A | * | 12/2016 |
| KR | 101761129 B1 | * | 7/2017 |

OTHER PUBLICATIONS

The product information page of Centaur® (Year: 2015).*
Machine generated English language translation of JP-2016215150-A (Year: 2016).*
Machine Generated translation of KR101761129 (B1) (Year: 2017).*

* cited by examiner

APPARATUS AND METHOD FOR PROVIDING ULTRAPURE WATER

BACKGROUND OF THE INVENTION

This application claims priority from European patent application number EP 18164647.2, filed Mar. 28, 2018, and PCT/IB2019/052577, filed Mar. 28, 2019.

This invention relates to an apparatus and a method for providing ultrapure water, in particular it relates to an apparatus and method for providing ultrapure water for use in semiconductor fabrication.

Ultrapure water is necessary as a cleaning medium in the production of electronic components for semiconductor chips (logic chips, DRAM (Dynamic Random Access Memory), NAND flash memory, and many more), integrated circuits, microsystems, medical devices, sensors and the like. The already high requirements to the quality of ultrapure water are still increasing in view of the ongoing structural miniaturization towards nanometer scale of these electronic components. Therefore, e.g. the particle content, the metallic impurities, ion content as well as the TOC (Total Organic Carbon) content has to be as low as possible (from sub ppb (parts per billion) level for TOC to ppt (parts per trillion) for ions down to ppq (parts per quadrillion) level for metals).

Normally, the production of ultrapure water takes place in several process steps, grouped into the so called Pre-treatment, the so called Make-Up and the so called Polishing section. The final Polishing-steps treat water pretreated through pre-treatment and Make up section further, in order to meet the requirements of microelectronics and similar technologies.

As a consequence, any corrosion and metallic particle release into the treated water should be avoided. In this context, it is preferred that the content of metallic particles in ultrapure water is at least less than 0.1 ppt (parts per trillion).

However, according to the state of the art, vessels used in the Polishing steps for ultrapure water, e.g. in state of the art photolysis reactors (UV/UV-reactors) are all made from stainless steel, as polymeric materials are not withstanding to UV light (≤400 nm) over long term.

In this context "UV" means "ultraviolet (radiation)". "VUV" means "vacuum ultraviolet (radiation)".

Further, in the prior art normally at least three separate devices are used in the Polishing steps to produce ultrapure water, namely an UV reactor, a device comprising at least one ion exchange resin and a device comprising at least one catalyst immobilized on a support. These devices and their arrangement in a plant take up a lot of space.

Therefore, on the one hand there is a general market demand in the ultrapure water production, in particular for semiconductor use, to have less and less contact between the water and metals and their alloys (e.g. steel) in the Polishing steps of this ultrapure water production. On the other hand, there is need for an improved apparatus for providing ultrapure water, which overcomes drawbacks of the presently known apparatus. In particular, there is a need to find an apparatus which reduces the high space requirement of apparatuses known from the prior art.

To overcome these drawbacks and to fulfil these needs the invention provides an apparatus for providing ultrapure water, in particular ultrapure water for use in semiconductor fabrication with the features of claim 1. Preferred embodiments of the inventive apparatus are defined in the claims dependent from claim 1.

The wording of all claims is hereby explicitly incorporated into this description by reference.

According to the invention, an apparatus mentioned above comprises at least one cylindrical reactor with an inner cylindrical shell, an outer cylindrical shell and a channel-like volume between inner shell and outer shell. Said inner cylindrical shell houses at least one UV emission device. Said outer cylindrical shell comprises at least one means for reflecting UV radiation. And said channel-like volume is provided for flowing water through the reactor.

In other words: the inventive apparatus comprises two tubes or pipes which are arranged concentrically. Due to this arrangement a space between the two tubes/pipes is formed which has an annular cross-sectional area. The at least one UV emission device is arranged within the inner tube/pipe. The water flows through the space between inner tube/pipe and outer tube/pipe. The outer tube/pipe comprises the at least one means for reflecting UV radiation.

As already explained above, the term "ultrapure water" (UPW) is water that has been purified to very strict specifications. This water should by definition contain only $H_2O$, and $H^+$ ions and $OH^-$ ions in equilibrium. As also already mentioned, ultrapure water is mainly used in the semiconductor industry, and also in the pharmaceutical industry, possibly at a lower purity grade.

According to the invention, the term "UV emission device" shall include any source which is capable to emit electromagnetic radiation with a wavelength between 10 nm and 400 nm. These sources can be so called UV lamps, like short-wave ultraviolet lamps, halogen lamps, gas-discharge lamps, excimer lamps, and can also be ultraviolet LEDs and ultraviolet lasers.

Preferably, an UV lamp is placed in the inner shell (cylinder) in a gas atmosphere, in particular in an atmosphere of air, nitrogen ($N_2$) or other inert gases, e.g. noble gases like argon.

In preferred embodiments of the inventive apparatus the inner cylindrical shell is made from $SiO_2$ (quartz), in particular from synthetic crystalline $SiO_2$. Such quartz materials, in particular quartz glasses have an excellent (maximum) optical transmittance for ultraviolet light. These materials are known as "synthetic UV-grade fused silica". These materials consist of a high-purity synthetically produced molten quartz material.

According to the invention it is preferred that the UV emission device has an emission spectrum with wavelength s 380 nm, wherein preferably said emission spectrum includes emission peaks ≤200 nm. In this context, it is further preferred if the emission spectrum includes at least emission peaks of 185 nm and of 254 nm.

As a preferred example for an UV emission device, a mercury low pressure UV lamp emits 90% UV light with a wavelength of approximately 254 nm and 10% UV light with a wavelength of approximately 185 nm. In particular the UV light with wavelength of 185 nm produces OH-radicals in water which can oxidize trace organic impurities to organic acids or even can mineralize those organic impurities to e.g. $CO_2/HCO_3^-$-ion, or to $SO_4^{2-}$-, $Cl^-$-ions, and $NO_3^-$-ions.

Those resulting substances will be removed completely by ion exchange resins in a further Polishing step for the ultrapure water.

According to the invention it is preferred if the outer cylindrical shell in an inventive apparatus is (also) made from $SiO_2$ (quartz). As the UV light from the UV emission device has already passed the water to be treated in the channel-like volume, use of a quartz material with a lower UV transmission rate (compared to ultrapure synthetic crystalline $SiO_2$) is sufficient as a material for the outer cylindrical shell.

Referring to the means for reflecting UV radiation in the inventive apparatus, use of different means is possible. E.g. use of a shield, in particular a foil surrounding the outer cylindrical shell at its outer surface is possible. Such shields can be made from an UV reflective metal, in particular from aluminum.

Nevertheless, according to the invention it is preferred if said means for reflecting UV radiation is at least one coating, which can be provided also in particular at the outer surface of said outer cylindrical shell. Also the coating can be made from any UV reflecting material, e.g. a metal like aluminum. Nevertheless, it is preferred if such a coating is made from $SiO_2$, preferably from amorphous $SiO_2$.

In principle the dimensions of the channel-like volume in the inventive apparatus are not critical. However, in order to support an effective treatment of the water with UV light it is preferred that the channel-like volume has a width between 0.1 mm and 100 mm. In particular said width is between 2 mm and 50 mm, preferably between 2 mm and 15 mm.

According to the invention, one continuous channel-like volume can be provided between inner cylindrical shell and outer cylindrical shell. In these cases, the water to be treated flows between the two shells along the channel-like volume unhindered. However, it is also possible and preferred according to the invention that said channel-like volume is made up from at least two chamber-like sections which are arranged (along the shells) in series. With these embodiments the water is treated with UV light in each section separately. These embodiments can also be used with advantage if more than one UV emission device is provided in the inner cylindrical shell. In these cases one UV emission device can be provided for each section of the channel-like volume so that the water is treated in each section by the UV light of another emission device one after the other.

With further preferred embodiments of the inventive apparatus the channel-like volume comprises means for generating a turbulent flow of flowing water in said volume. With this measure, contact between UV light and water and contact of the components in the water will be intensified and the efficiency of the UV treatment increases. For example, there will be an improved homogeneous distribution of OH radicals in the water for their reaction with organic impurities. Those OH radicals are primarily formed near to the UV emission device in the water close to the inner shell and are better distributed in the water volume by said means.

Said means for generating a turbulent flow are preferably static means which are firmly installed in the channel-like volume. In particular said means are spiral components, preferably spiral components made from $SiO_2$. In this context, use of spiral components made from crystalline $SiO_2$ as mentioned before is preferred, because of their high UV transmission rate, their chemical stability and stability against UV light Further, in preferred embodiments the inventive apparatus comprises a cylindrical shield enclosing that outer cylindrical shell of the cylindrical reactor. This additional cylindrical shield formed also like a tube or pipe houses and protects the cylindrical reactor, preferably with only slightly larger dimensions. This additional shield also defines a boundary surface to further components included in a device for providing ultrapure water.

Said additional cylindrical shield is preferably made from plastic or has at least a surface made from plastic.

According to the invention, in principle the overall dimensions of the inventive apparatus are not critical. However, it is preferred, if the inventive apparatus (reactor), including a cylindrical shield (where applicable) has a length/height between 500 mm and 3000 mm, in particular between 1000 mm and 2000 mm, and a diameter between 100 mm and 500 mm, preferably between 200 mm and 400 mm.

In other preferred embodiments of the invention the cylindrical reactor is contained in a vessel, in particular a cylindrical vessel. This vessel can be made from steel, stainless steel or other metallic materials, like titanium and titanium alloys. However, preferably this vessel is (also) made from plastic materials or at least has a surface made from plastic materials.

According to the invention it is preferred, if said vessel is a pressure vessel which can be used with pressures up to 15 bar.

The vessel, preferably cylindrical vessel can include more than one cylindrical reactor according to the invention, in particular a number of reactors arranged as an array. With this measure, a greater amount of water can be treated with the inventive apparatus. Normally and preferably the cylindrical reactors are installed in the vessel in a way that the water to be treated enters the cylindrical reactor at its bottom and exits the cylindrical reactor at its top.

According to further preferred embodiments of the inventive apparatus at least part of the volume between the vessel (containing the cylindrical reactor) and the outer cylindrical shell or at least part of the volume between the vessel and the shield enclosing the outer cylindrical shell is provided for at least one further treating step of that water flowing through the reactor. With this measure a space-saving design of the overall apparatus is possible.

With the last-mentioned embodiments it is preferred that said volume (for further treating the water) is filled at least partly with at least one absorbing material, preferably at least one ion exchange resin. Further, with the last-mentioned embodiments it is also preferred that said volume (for further treating the water) is filled at least partly with at least one catalyst, wherein preferably said catalyst is immobilized on a support.

The (outer) volume (for further treating of water) in the last-mentioned embodiments is passed by the water which exits the cylindrical reactor preferably from the top and collected at the bottom of the vessel through nozzles. Then the fully treated ultrapure water of the Polishing steps exits the vessel.

The catalyst is normally immobilized on an alkaline support (i.e. a anion exchange resin in OH form). The catalyst can be preferably chosen from noble metals, in particular palladium or platinum, in element form with a high surface area. The concentration of the metal will be e.g. 1 g per liter resin. The resin including the catalyst can be layered on top of the mixed bed resin. It can be also layered on mixed bed (ion exchange) resin as a mixture of 5% to 15% catalyst mixed up with anion resin or mixed bed resin in terms of 50% to 95% content, preferably between 10% and 30% of catalyst resin.

Preferably, if the filling material is composed of a noble metal catalyst (in particular $Pd^0$ or $Pt^0$) on an anion exchange resin support, possibly mixed or layered with mixed bed resins, $H_2O_2$ (hydrogen peroxide) produced in the cylindrical reactor (normally 1 to 100 ppb (parts per billion)) is removed by a catalytic reaction to produce water ($H_2O$) and oxygen ($O_2$). By adding some hydrogen gas ($H_2$) into the feed water stream of the overall apparatus, the dissolved oxygen (as produced from $H_2O_2$ above) can be removed by catalytic reaction to produce water. The photolysis reaction producing OH radicals is also producing some H radicals following the chemical equation:

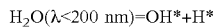

$$H_2O(\lambda<200\ nm)=OH^*+H^*$$

Through radical recombination there is generation of more stable $H_2O_2$ from 2 OH radicals and some $H_2$ gas from 2H radicals.

The produced $H_2$ gas is participating on the noble metal catalyst ($Pd^0$ and/or $Pt^0$) to reduce $H_2O_2$ to $H_2O+O_2$ and $O_2$ to $H_2O$.

As a result an ultrapure water with a residual level of <10 ppb, resp. <1 ppb $H_2O_2$ can be provided at the outlet of the overall inventive apparatus.

In addition to the inventive apparatus as described above, the invention also includes a method for providing ultrapure water, in particular ultrapure water for use in semiconductor fabrication.

In this method water is flown through a channel-like volume provided between an inner cylindrical shell and an outer cylindrical shell of a cylindrical reactor in an inventive apparatus.

Finally, the invention includes use of the inventive apparatus in the production of ultrapure water, in particular in the production of ultrapure water for use in semiconductor fabrication. With this use contact of said ultrapure water with metals or alloys is minimized or even avoided. Preferably this use takes place in the Polishing steps of the production of ultrapure water.

The invention is associated with a number of advantages.

First, it has to be mentioned that with the inventive apparatus comprising at least one cylindrical reactor with the described features contact of the water with metals or metal alloys can be minimized or even avoided. With the invention the inner cylindrical shell, the outer cylindrical shell and the channel-like volume between the two shells are made from materials, in particular quartz materials, which do not contain any metal. This is also true for any material used in further treating steps of said water, after UV irradiation.

Further, UV irradiation according to the invention is more effective. Normally, UV light with a wave length of 185 nm is absorbed by water after approximately 10 mm to 11 mm. UV light with a wave length of 254 nm can pass water completely. As a consequence, the reflecting means for UV radiation on the outer cylindrical shell have two effects. First, UV light with a wave length of 254 nm is reflected back to the water so that the positive concentration of OH radicals can be increased by dissociating again $H_2O_2$ (formed by recombination of OH radicals) to OH radicals.

Second, by reflecting the UV light any damage caused by UV radiation outside the cylindrical reactor can be minimized or avoided.

Finally, the invention combines the removal of organic impurities (TOC), the removal of $H_2O_2$ and the removal of (metal) ions in ultrapure water by UV/UV-photolysis, catalytic peroxide treatment and mixed bed ion exchange resin in one sole device instead of three individual devices without any contact of water with metallic, in particular steel parts.

Further advantages and features of the overall invention will be become clear from the following description of the drawings and the example in conjunction with the dependent claims. The individual features can be realized either singly or jointly in combination in one embodiment of the invention. The drawings and the example only serve for illustration and better understanding of the invention and are not to be understood as in any way limiting the invention.

In the drawings show

Figure 2A:
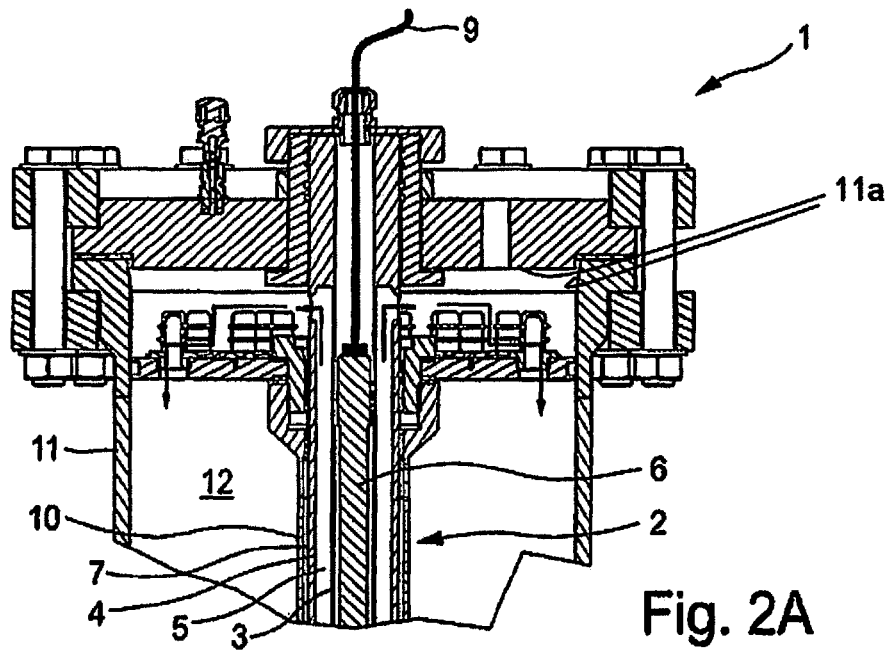
Figure 2B:
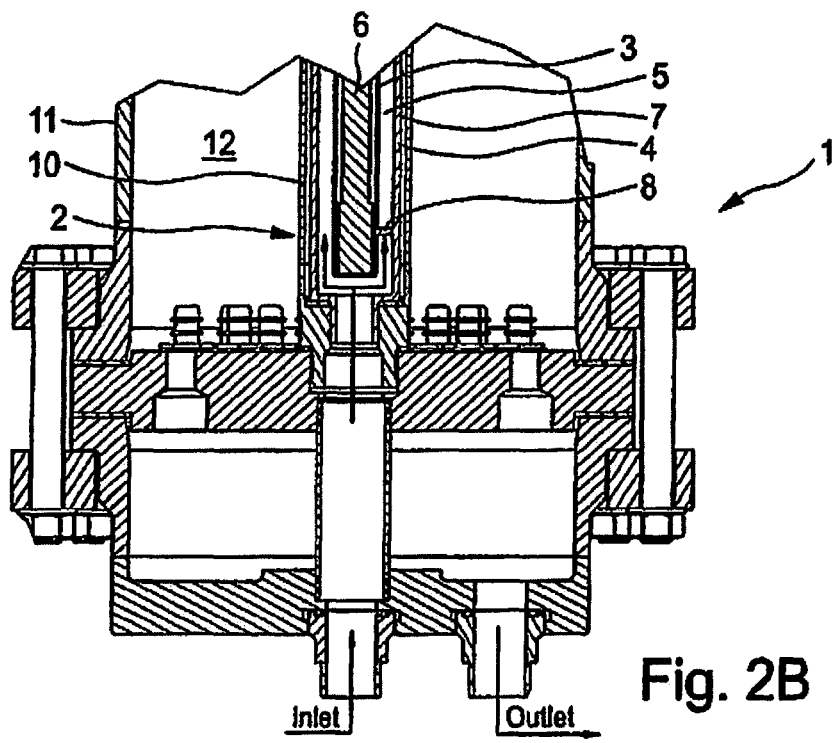
Figure 3:
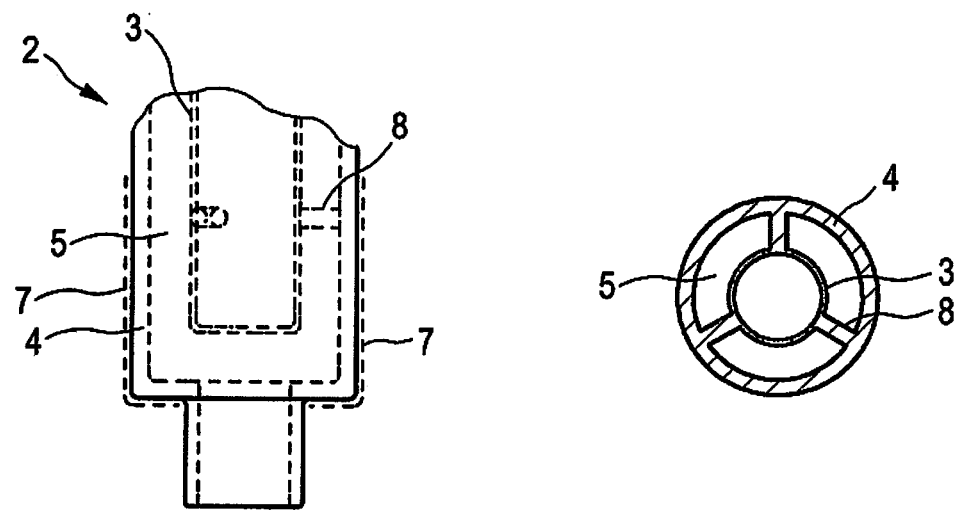
Figure 4:
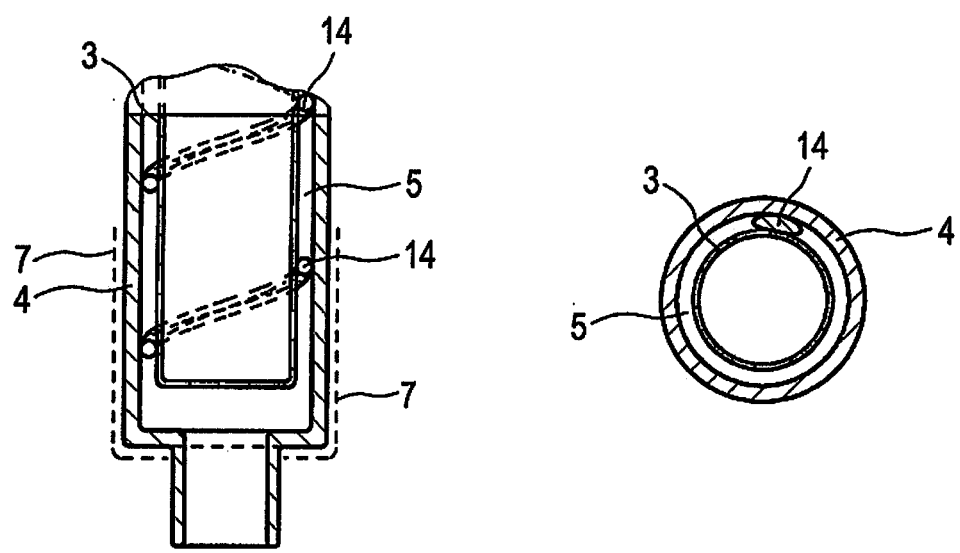
Figure 5:
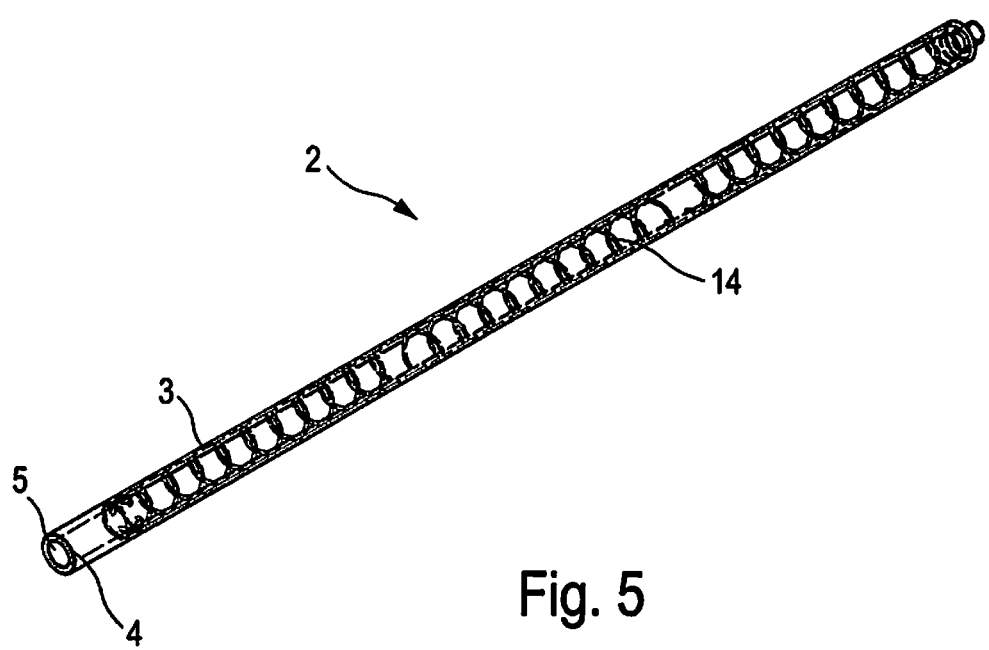

FIG. 1 a schematic sectional view of an apparatus according to the invention,

FIGS. 2A and 2B schematic sectional views of essential parts of the inventive apparatus according to FIG. 1, FIG. 3 further schematic detail views of the inventive apparatus according to FIG. 1, FIG. 4 schematic detail views of another apparatus according to the invention with spiral components, and FIG. 5 a schematic isometric view of an apparatus according to the invention with spiral components.

Apparatus 1 according to FIG. 1 comprises one elongated cylindrical reactor 2 of tubular shape. This cylindrical reactor 2 has an inner shell 3, an outer shell 4 and a channel 5 (channel-like volume) between inner shell 3 and outer shell 4. In other words: cylindrical shell 3 is arranged concentrically in cylindrical outer shell 4.

As also shown in FIG. 1 inner cylindrical shell 3 houses a UV emission device 6, e.g. a mercury low pressure UV lamp.

On the outer surface of the outer cylindrical shell 4 there is a coating 7 as a reflecting means for UV radiation. This is not shown in FIG. 1 in detail, but the corresponding coating is explicitly shown in FIGS. 2A and 2B.

The water treated in the inventive apparatus 1 flows through channel 5 from the bottom to the top of apparatus 1. This is illustrated by the left arrow at the very bottom of FIG. 1.

FIG. 1 further shows support rod 8 which increases mechanical stability of cylindrical reactor 2 between inner shell 3 and outer shell 4, cable 9 for power supply of UV emission device 6, elongated cylindrical shield 10 enclosing outer shell 4, cylindrical vessel 11 housing cylindrical reactor 2, and defining a volume 12 between shield 10 and vessel 11, and absorbing material 13, e.g. ion exchange resins and/or catalysts immobilized on a support for further treating steps of the water flowing through the reactor.

According to preferred embodiments of the invention, in the apparatus 1 of FIG. 1 inner shell 3 is made from synthetic ultrapure crystalline quartz and outer shell 4 is made from crystalline standard quartz. The UV reflective coating 7 on the outer surface of shell 4 is also made from amorphous Silica.

FIG. 2A includes a larger view from the top part of apparatus 1 (see FIG. 1), and FIG. 2B includes a larger view of the bottom part of apparatus 1 (see FIG. 1).

Also, according to FIG. 2A cylindrical reactor 2 comprises inner cylindrical shell 3 (housing UV emission device 6), outer cylindrical shell 4 (comprising an UV reflecting coating 7 at its outer surface), and channel 5 between inner shell 3 and outer shell 4.

Further, FIG. 2A shows power supply cable 9 for UV emission device 6. Also illustrated are cylindrical shield 10 and vessel 11, defining volume 12 between them.

By the arrows in FIG. 2A it is also shown that the water treatment in apparatus 1 flows in channel 5 from the bottom to the top or downstream end, and is then redirected by flow reversal end structure 11a to flow from the top to the bottom through volume 12.

Also, in FIG. 2B the same components of apparatus 1 are illustrated as in FIG. 2A. Therefore, cylindrical reactor 2 comprises inner cylindrical shell 3, outer cylindrical shell 4 and channel 5 (channel-like volume) between inner shell 3 and outer shell 4. UV emission device/lamp 6 is arranged within inner shell 3. Coating 7 is provided at the outer surface of outer shell 4 as an UV reflective means. Further, support rod 8 between inner shell 3 and outer shell 4 is shown in FIG. 2B.

Outer shell 4 is shielded by cylinder 10. Vessel 11 houses cylindrical reactor 2 with volume 12 between cylindrical shield 10 and vessel 11.

The water to be further purified in apparatus 1 flows into the apparatus from the bottom (see "inlet"), and then flows through channel 5 to the top of apparatus 1 (see illustration in FIG. 2A).

Redirected water flow is channeled through volume 12 for further treatment, and exits apparatus 1 at its bottom (see "outlet" in FIG. 2B).

FIG. 3 shows two other detail views of apparatus 1 (see FIG. 1), namely the bottom part of cylindrical reactor 2 in apparatus 1.

In this context, on the left FIG. 3 illustrates in a sectional view inner cylindrical shell 3 and outer cylindrical shell 4 with support rod 8 between inner shell 3 and outer shell 4. Further, inner shell 3 and outer shell 4 define channel-like volume/channel 5 between them. The water to be treated will flow into cylindrical reactor 2 from the bottom and then into channel 5 up to the top of cylindrical reactor 2 (not shown in FIG. 3).

The detail view on the right side of FIG. 3 is a sectional view of the left illustration of FIG. 3 at the position of support rod 8. Besides inner shell 3, outer shell 4 and channel 5, this sectional view also shows that there are three support rods 8 at a radial distance of 120°.

UV reflective coating 7, which is illustrated at the outer surface of outer shell 4 in the left illustration of FIG. 3 is not shown in the right illustration of FIG. 3.

FIG. 4 shows detail views of another cylindrical reactor 2 in an inventive apparatus, which differs from the cylindrical reactor 2 shown in FIGS. 1 to 3 by the presence of a static means for generating a turbulent flow in the form of spiral components.

In this context, FIG. 4 in its left illustration shows cylindrical reactor 2, inner cylindrical shell 3, outer cylindrical shell 4 and channel 5 between these two shells 3, 4. Further, this illustration also shows an UV reflective coating 7 on the outer surface of outer shell 4.

According to the left illustration of FIG. 4, in this embodiment of the cylindrical reactor 2 spiral components 14 are provided within channel 5. This/These spiral component(s) 14 wind(s) up, preferably in a number of consecutive spiral segments, from the bottom of the cylindrical reactor up to the top of the cylindrical reactor.

As explained earlier spiral component(s) 14 has/have the function of a static mixer and turbulence promoter to get better homogeneity of the OH radicals produced by UV light in their interaction with the organic molecules which have to be oxidized.

In the other illustration of FIG. 4 on its right side, a sectional view at the position of the turning point of component 14 (left illustration in FIG. 1) is shown. This sectional view shows inner shell 3, outer shell 4, and spiral component 14 within channel 5.

For an even better understanding of an apparatus and cylindrical reactor including spiral components FIG. 5 shows such a cylindrical reactor 2 in an isometric view. This isometric view illustrates inner cylindrical shell 3, outer cylindrical shell 4, and channel 5 between these two shells 3, 4. Further, FIG. 5 illustrates spiral component(s) 14 winding up in the channel 5 in the form of segments.

EXAMPLE

An apparatus/device as shown in FIG. 1 with reference sign 1 has a height/length of 1700 mm and a diameter of 300 mm of its cross sectional area. This apparatus comprises a cylindrical reactor (reference sign 2 in FIG. 1) with a length of 1500 mm. The inner cylindrical shell (reference sign 3 in FIG. 1) of the cylindrical reactor houses a mercury low pressure lamp with an electric power of 300 W. The width of the channel-like volume (reference sign 5 in FIG. 1) in the cylindrical reactor is 11 mm.

Further, the apparatus used in the example comprises a catalyst resin and an ion exchange resin (in the volume designated with reference sign 12 in FIG. 1) for further treating the water after the UV-treatment step. In the example, the apparatus contains 25 liter of catalyst resin (strong base anion exchange resin with 1 g/L $Pd^0$) and 50 liter of mixed bed ion exchange resin (UPW grade).

With the described apparatus two feedwater samples (pretreated through pre-treatement and MakeUp section) are further treated to provide ultrapure water. These (pretreated) ultrapure water samples include ethanol as an organic molecule to be oxidized.

1. The first feedwater sample comprises 9.3 ppb TOC and is treated in the apparatus with a capacity of 1 $m^3$/h at a temperature of 22° C.

After treatment with UV-radiation in the inventive cylindrical reactor the ultrapure water contains 6 ppb TOC and 41 ppm $H_2O_2$. After further treatment by the catalyst resin and the mixed bed ion exchange resin, i. e. after the final polishing step, the ultrapure water has 0.9 ppb TOC and 3 ppb $H_2O_2$.

2. The second feedwater sample comprises 30.3 ppb TOC and is treated in the apparatus with a capacity of 2 $m^3$/h at a temperature of 22° C.

After treatment with UV-radiation in the inventive cylindrical reactor the ultrapure water contains 23.1 ppb TOC and 62.8 ppm $H_2O_2$. After further treatment by the catalyst resin and the mixed bed ion exchange resin, i. e. after the final polishing step, the ultrapure water has 2.9 ppb TOC and 3.6 ppb $H_2O_2$.

The invention claimed is:

1. A system comprising an apparatus providing ultrapure water for use in semiconductor fabrication, the system including a flow of water through the apparatus, comprising:
    a circular-cylindrical reactor (2) with an inner cylindrical shell (3), an outer circular-cylindrical shell (4) arranged concentrically around the inner cylindrical shell and having a larger diameter than a diameter of the inner cylindrical shell, defining an annular channel volume (5) formed between the inner shell and the outer shell, with the flow of water through the annular channel volume (5),
    an outer circular-cylindrical vessel (11) concentrically positioned around the outer shell (4) and having a larger diameter than the outer cylindrical shell to define an outer volume with the flow of water extending through the outer volume,
    a flow inlet port in one end of the reactor to said annular channel volume, with the flow of water entering through the inlet port, and a flow outlet port in said one end of the reactor from said outer volume, defining a flow path of the flow of water from the inlet port at said one end to an opposite, downstream end of the annular channel volume (5) and through a flow reversal end structure at said downstream end and into the outer volume (12) so that the flow of water flowing through and exiting the annular channel volume then reverses direction and enters and flows through the outer volume, the water exiting the outer volume through the flow outlet port, a UV emission device within said inner shell (3), for UV transmission through the water flowing through the annular channel volume (5) to oxidize organic molecules in the water, the outer volume containing at least one of: an adsorbing material comprising an ion exchange resin capable of removing oxidized organic materials from the UV-treated water; and a catalyst capable of removing hydrogen peroxide from the UV treated water, the inner cylindrical shell (3), the outer cylindrical shell (4) and the annular channel volume throughout the flow of water being without metal components so that the water flowing through the annular channel volume does not make contact with any metal, and the cylindrical reactor with the inner and outer cylindrical shells and the annular channel volume, as well as the outer cylindrical vessel and the outer volume, being contained in said apparatus as a sole unitary device, whereby ultrapure water is provided by the water flowing through the annular channel volume for UV treatment and oxidization of organic materials, with the UV-treated water then reversing direction at said flow reversal end structure and flowing through the outer volume where hydrogen peroxide and/or oxidized organic materials are removed, all within a single unitary device.

2. Apparatus according to claim 1, wherein the outer cylindrical shell comprises a reflector for reflecting UV radiation.

3. Apparatus according to claim 1, wherein the outer volume contains both said ion exchange resin and said catalyst, the catalyst positioned to treat the UV-treated water prior to treatment with the ion exchange resin.

4. Apparatus according to claim 1, wherein the outer volume contains said catalyst, which consists essentially of palladium or platinum.

5. Apparatus according to claim 4, wherein the outer volume is without metals other than said palladium or platinum, so that water flowing through the apparatus does not make contact with any metal except said palladium or platinum.

6. Apparatus according to claim 1, wherein said inner cylindrical shell (3) is made from synthetic crystalline $SiO_2$, with a UV transmission rate.

7. Apparatus according to claim 1, wherein said UV emission device (6) has an emission spectrum with wave lengths ≤380 nm, with emission peaks of 185 nm and 254 nm.

8. Apparatus according to claim 1, wherein said outer cylindrical shell (4) is made from $SiO_2$, with an UV transmission rate lower than that of synthetic crystalline $SiO_2$.

9. Apparatus according to claim 2, wherein said reflector for reflecting UV radiation is at least one coating (7), made from amorphous $SiO_2$.

10. Apparatus according to claim 1, wherein said channel volume (5) has a width between 2 mm and 50 mm.

11. Apparatus according to claim 1, wherein said channel volume is made up from at least two chamber sections which are arranged in series.

12. Apparatus according to claim 1, wherein said channel volume (5) comprises means (14) for generating a turbulent flow of flowing water in said channel volume, wherein said means are spiral components made from $SiO_2$.

13. Apparatus according to claim 1, wherein said cylindrical reactor (2) further comprises a cylindrical shield (10) enclosing said outer cylindrical shell (4), wherein said shield is made from plastic or has a surface made from plastic.

14. Method for semiconductor fabrication including providing ultrapure water for such fabrication, wherein water is flowed through the channel volume (5) provided between the inner cylindrical shell (3) and the outer cylindrical shell (4) of the cylindrical reactor (2) and through the outer volume in an apparatus (1) according to claim 1.

* * * * *